(12) United States Patent
Gualandri

(10) Patent No.: US 7,819,312 B2
(45) Date of Patent: Oct. 26, 2010

(54) METHOD AND SYSTEM FOR OPERATING MACHINES

(75) Inventor: J. Joseph Gualandri, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 1094 days.

(21) Appl. No.: 11/495,545

(22) Filed: Jul. 31, 2006

(65) Prior Publication Data

US 2008/0121684 A1    May 29, 2008

Related U.S. Application Data

(63) Continuation-in-part of application No. 11/477,514, filed on Jun. 30, 2006.

(51) Int. Cl.
*G06K 5/00* (2006.01)
(52) U.S. Cl. .................................................. 235/382
(58) Field of Classification Search ................. 235/382; 701/50
See application file for complete search history.

(56) References Cited

U.S. PATENT DOCUMENTS

| | | |
|---|---|---|
| 4,177,466 A | 12/1979 | Reagan |
| 4,818,998 A | 4/1989 | Apsell et al. |
| 5,055,851 A | 10/1991 | Sheffer |
| 5,229,648 A | 7/1993 | Sues et al. |
| 5,418,537 A | 5/1995 | Bird |
| 5,563,579 A | 10/1996 | Carter |
| 5,652,564 A | 7/1997 | Winbush |
| 5,661,473 A | 8/1997 | Paschal |
| 5,895,436 A | 4/1999 | Savoie et al. |
| 5,929,753 A | 7/1999 | Montague |
| 5,951,611 A | 9/1999 | La Pierre |
| 5,991,673 A | 11/1999 | Koopman, Jr. et al. |
| 6,025,774 A | 2/2000 | Forbes |
| 6,034,596 A | 3/2000 | Smith et al. |
| 6,052,065 A | 4/2000 | Glover |
| 6,060,981 A | 5/2000 | Landes |
| 6,067,007 A | 5/2000 | Gioia |
| 6,157,317 A | 12/2000 | Walker |
| 6,184,801 B1 | 2/2001 | Janky |
| 6,216,066 B1 | 4/2001 | Goebel et al. |
| 6,222,463 B1 | 4/2001 | Rai |
| 6,262,659 B1 | 7/2001 | Korkosz et al. |
| 6,292,723 B1 | 9/2001 | Brogan et al. |
| 6,298,306 B1 | 10/2001 | Suarez et al. |
| 6,301,531 B1 | 10/2001 | Pierro et al. |
| 6,314,350 B1 | 11/2001 | Butz et al. |

(Continued)

FOREIGN PATENT DOCUMENTS

GB    2335002    9/1999

(Continued)

*Primary Examiner*—Daniel A Hess
(74) *Attorney, Agent, or Firm*—Finnegan, Henderson, Farabow, Garrett & Dunner LLC

(57) ABSTRACT

A method for operating a machine and/or a component of the machine includes collecting machine data from the machine and/or machine component over a communications network. The machine data includes data reflecting at least one operational parameter associated with the machine and/or machine component. The method also includes determining that the machine and/or machine component is in an abnormal condition based on the collected machine data, and derating the machine and/or machine component based on determining that the machine and/or machine component is in the abnormal condition.

15 Claims, 3 Drawing Sheets

U.S. PATENT DOCUMENTS

| | | | |
|---|---|---|---|
| 6,336,065 B1 | 1/2002 | Gibson et al. |
| 6,339,745 B1 | 1/2002 | Novik |
| 6,366,199 B1 | 4/2002 | Osborn et al. |
| 6,405,108 B1 | 6/2002 | Patel et al. |
| 6,408,259 B1 | 6/2002 | Goebel et al. |
| 6,434,458 B1 | 8/2002 | Laguer-Diaz et al. |
| 6,437,705 B1 | 8/2002 | Barich et al. |
| 6,490,513 B1 | 12/2002 | Fish et al. |
| 6,501,849 B1 | 12/2002 | Gupta et al. |
| 6,502,018 B1 | 12/2002 | Bessler |
| 6,539,271 B2 | 3/2003 | Lech et al. |
| 6,543,007 B1 | 4/2003 | Bliley et al. |
| 6,580,983 B2 | 6/2003 | Laguer-Diaz et al. |
| 6,591,182 B1 | 7/2003 | Cece et al. |
| 6,611,740 B2 | 8/2003 | Lowrey et al. |
| 6,636,771 B1 | 10/2003 | Varma et al. |
| 6,636,790 B1 | 10/2003 | Lightner et al. |
| 6,643,801 B1 | 11/2003 | Jammu et al. |
| 6,647,356 B2 | 11/2003 | Pierro et al. |
| 6,650,949 B1 | 11/2003 | Fera et al. |
| 6,651,034 B1 | 11/2003 | Hedlund et al. |
| 6,691,064 B2 | 2/2004 | Vroman |
| 6,708,038 B1 | 3/2004 | Laguer-Diaz et al. |
| 6,732,031 B1 | 5/2004 | Lightner et al. |
| 6,738,931 B1 | 5/2004 | Osborn et al. |
| 6,781,513 B1 | 8/2004 | Korkosz et al. |
| 6,791,456 B2 | 9/2004 | Nakayama et al. |
| 6,799,154 B1 | 9/2004 | Aragones et al. |
| 6,801,312 B1 | 10/2004 | Tiwald |
| 6,833,787 B1 | 12/2004 | Levi |
| 6,850,869 B2 | 2/2005 | Pierro et al. |
| 6,856,968 B2 | 2/2005 | Cooley et al. |
| 6,885,903 B2 | 4/2005 | Olle et al. |
| 6,901,377 B1 | 5/2005 | Rosenfeld et al. |
| 6,917,306 B2 | 7/2005 | Lilja |
| 6,947,797 B2 | 9/2005 | Dean et al. |
| 6,950,829 B2 | 9/2005 | Schlabach et al. |
| 6,957,133 B1 | 10/2005 | Hunt et al. |
| 6,959,235 B1 | 10/2005 | Abdel-Malek et al. |
| 6,980,124 B2 | 12/2005 | Kong et al. |
| 6,985,803 B2 | 1/2006 | Abdel-Malek et al. |
| 6,988,011 B2 | 1/2006 | Varma et al. |
| 6,993,675 B2 | 1/2006 | Roddy et al. |
| 6,996,498 B2 | 2/2006 | Pierro et al. |
| 7,031,239 B2 | 4/2006 | Takahashi et al. |
| 7,031,878 B2 | 4/2006 | Cuddihy et al. |
| 7,471,192 B2 | 12/2008 | Hara et al. |
| 2002/0173885 A1 | 11/2002 | Lowrey et al. |
| 2004/0003249 A1 | 1/2004 | Dabbish et al. |
| 2004/0004540 A1 | 1/2004 | Komatsu et al. |
| 2004/0235516 A1 | 11/2004 | Otsuki et al. |
| 2004/0236489 A1 | 11/2004 | Shibamori et al. |
| 2005/0171660 A1 | 8/2005 | Woolford et al. |
| 2006/0041380 A1 | 2/2006 | Motoyama et al. |
| 2006/0055564 A1 | 3/2006 | Olsen et al. |
| 2006/0071783 A1 | 4/2006 | Culpepper et al. |
| 2006/0095175 A1 | 5/2006 | deWaal et al. |

FOREIGN PATENT DOCUMENTS

| | | |
|---|---|---|
| GB | 2335002 A | 9/1999 |
| GB | 2374227 A | 10/2002 |
| GB | 2420052 A | 5/2006 |
| JP | 2000-259900 | 9/2000 |
| JP | 2001-343446 | 12/2001 |
| WO | WO 98/56626 | 12/1998 |

METHOD AND SYSTEM FOR OPERATING MACHINES

RELATED APPLICATION

This is application is a continuation-in-part of application Ser. No. 11/477,514 filed on Jun. 30, 2006, for "Method And System For Providing Signatures For Machines," which is incorporated herein by reference.

TECHNICAL FIELD

The present disclosure relates generally to a method and system for locating machines, and more particularly, to a method and system for operating machines.

BACKGROUND

Machines and machine components have routinely been the target of thieves, especially when there is a need for equipment, such as after a natural disaster. Stolen machines may be stripped and sold for parts, and therefore, create difficulties for authorities and machine owners to identify missing parts. To assist with identifying machines and machine components, markings are used, such as labels, etchings, etc., that uniquely identify a given component or machine. However, these markings may be removed or altered to change the identification information.

Furthermore, law enforcement officials may not be trained to identify machines properly. For example, transported machines that are subject to inspection may have identification information printed on a component or sticker attached to the machine. However, alterations to the identification information frustrate the machine identification process. That is, law enforcement attempts to accurately identify machines with altered markings and identifications hinder the ability to locate missing machines and components.

One method of locating a missing vehicle is described in U.S. Pat. No. 5,418,537 (the '537 patent) to Bird. In the system disclosed by the '537 patent, a vehicle owner notifies a vehicle location service center that a vehicle is missing. In response, the vehicle location service center broadcasts a paging request. The paging request is received by the vehicle, which sends its present location to the vehicle location service center so that the vehicle can be recovered.

Although the system of the '537 patent provides a method for recovering missing vehicles by broadcasting a paging request to the missing vehicle, the method has some drawbacks. For example, once the missing vehicle is located electronically, there is a time delay until the actual retrieval of the vehicle because the person retrieving the missing vehicle must travel to the location of the vehicle. Thus, the missing vehicle may be moved while the person sent to retrieve the missing vehicle is en route to the vehicle's detected location. Furthermore, if the paging responder or a similar device is removed from the vehicle, the vehicle is unable to respond to the paging request and thus unable to be located.

The disclosed system is directed to overcoming one or more of the problems set forth above.

SUMMARY OF THE INVENTION

In one aspect, the present disclosure is directed to a method for operating a machine and/or a component of the machine. The method includes collecting machine data from the machine and/or machine component over a communications network. The machine data includes data reflecting at least one operational parameter associated with the machine and/or machine component. The method also includes determining that the machine and/or machine component is in an abnormal condition based on the collected machine data, and derating the machine and/or machine component based on determining that the machine and/or machine component is in the abnormal condition.

In another aspect, the present disclosure is directed to a system for operating a machine and/or a component of the machine. The system includes a service center configured to collect and store machine data from the machine and/or machine component over a communications network. The machine data includes data reflecting at least one operational parameter associated with the machine and/or machine component. The service center is also configured to determine that the machine and/or machine component is in an abnormal condition based on the collected machine data, and send a command to the machine and/or machine component to derate based on determining that the machine and/or machine component is in the abnormal condition.

In yet another aspect, the present disclosure is directed to a method for operating a machine and/or a component of the machine. The method includes storing machine data associated with the machine and/or machine component. The machine data includes data reflecting at least one operational parameter associated with the machine and/or machine component. The method also includes determining that the machine and/or machine component is in an abnormal condition based on the machine data, and automatically derating the machine and/or machine component based on the determining that the machine and/or machine component is in the abnormal condition.

DETAILED DESCRIPTION

Figure 1:
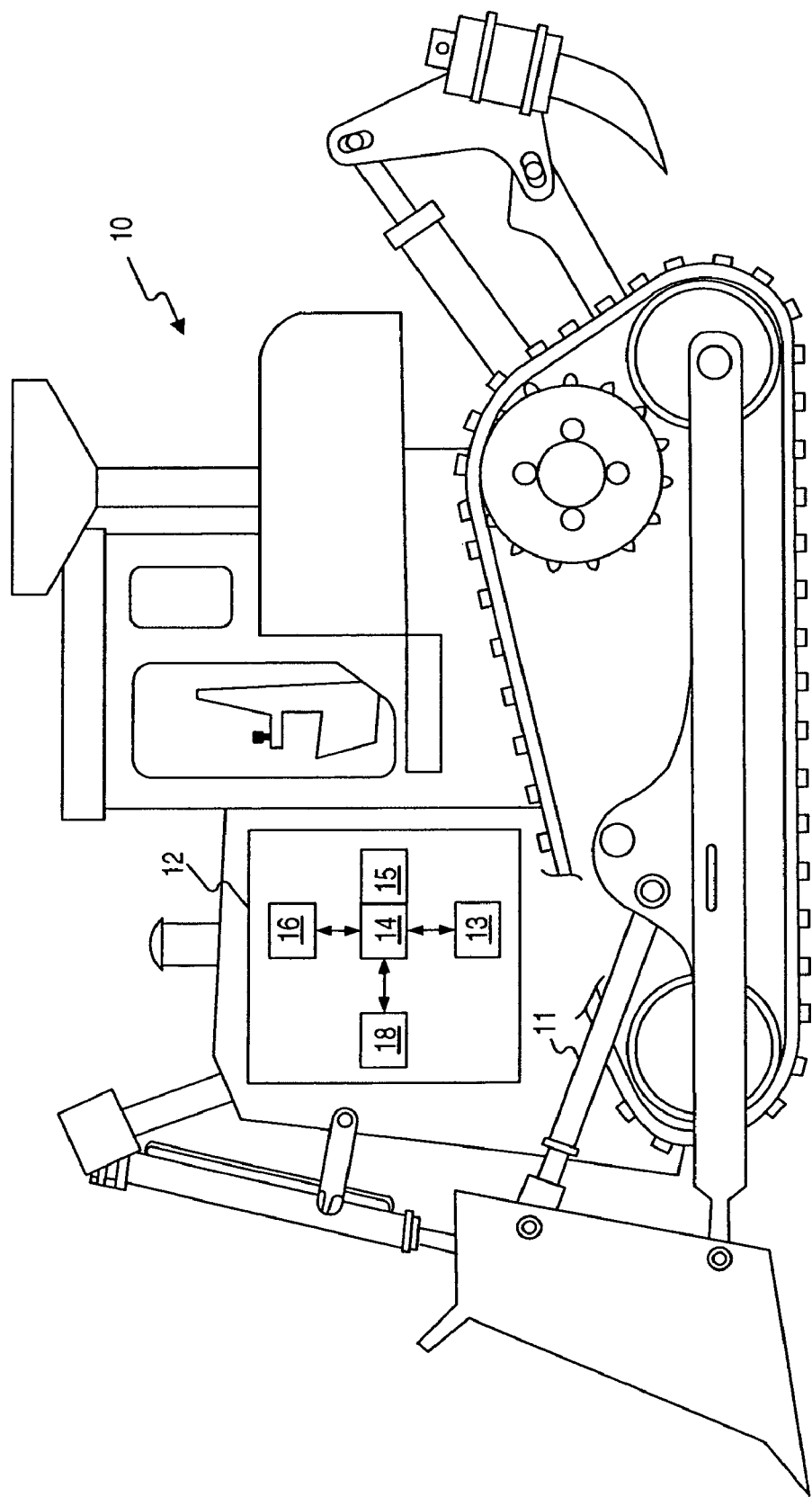
FIG. 1 is a diagrammatic illustration of an exemplary machine consistent with disclosed embodiments.

FIG. 1 illustrates an exemplary machine 10 having one or more components 11. A machine component 11 may be an electronic, electrical, mechanical, electro-mechanical, etc., portion of machine 10 that performs some operation related to the overall operation of machine 10 (e.g., a hydraulic component, an engine, a transmission, etc.). Machine 10 may embody a fixed or mobile machine that performs some type of operation associated with an industry such as mining, construction, farming, transportation, or any other industry known in the art. For example, machine 10 may be a commercial machine, such as a truck, crane, earth moving machine, mining vehicle, material handling equipment, farming equipment, marine vessel, aircraft, an excavator, a dozer, a loader, a backhoe, a motor grader, a dump truck, or any type of machine that operates in a work environment such as a construction site, mine site, power plant, etc.

Machine 10 may be equipped with a data communication system 12, which includes at least one electronic control module (ECM) 13, a gateway processor device 14, a transceiver device 15, and a global positioning satellite (GPS) device 16. Although the following description relates to the identification of machine 10, one or more machine components 11 may each also be equipped with data communication system 12. Accordingly, in certain embodiments, machine 10 may include multiple data communication systems 12 mounted on one or more separate machine components 11.

Data communication system 12 may be a system configured to collect and transmit machine data, location data, and identification data. In one embodiment, ECM 13 stores machine data including, for example, identification information specific to machine 10. For example, the identification information may include a machine identifier (e.g., a serial number, registration number, or other information assigned to machine 10). Further, ECM 13 may collect and/or store other types of machine data, such as scheduling data (e.g., when machine 10 is scheduled to change location and/or how long machine 10 is scheduled to remain at a location, identification of types of authorized operations during scheduled shifts, etc.), machine operational data (e.g., operational historical parameter data (e.g., oil pressure, motor speed, temperatures, fluid levels, and/or other parameter data related to the operation of machine 10 or a component 11)), timings, fault codes, etc. ECM 13 may collect the machine data from one or more machine components 11. Alternatively, or in addition, ECM 13 may collect machine data from one or more other ECMs 13 associated with one or more other machine components 11.

ECM 13 may also be associated with at least one sensor (not shown) for monitoring and recording at least one type of machine data. For example, an engine ECM may receive signals from engine sensors, such as, for example, an atmospheric pressure sensor, a fuel flow sensor, a boost pressure sensor, a water temperature sensor, and an engine speed sensor. Additional sensors may be included to measure other properties of the engine as necessary, as would be apparent to one skilled in the art. Another exemplary ECM is a transmission ECM, which may be associated with sensors that monitor the transmission, such as a gear code sensor, a transmission output speed sensor, and a differential oil temperature sensor. Other sensors may be associated with the transmission ECM as would be apparent to one skilled in the art.

As explained, machine 10 may include multiple ECMs 13. Each of these ECMs 13 may be different types of ECMs 13. For example, machine 10 may include a hydraulic system ECM, a chassis ECM, and/or a brake/cooling ECM. These other ECMs may also be associated with one or more sensors for collecting machine data related to one or more machine components 11, such as a hydraulic system, the chassis, the brake/cooling systems, etc. Other sensors and ECMs may be included for collecting machine data related to other components as would be apparent to one skilled in the art. Each ECM may be associated with one or more sensors, and the specific types of sensors and the number of sensors associated with each ECM may be based on the type of application and information to be obtained by the sensors.

Figure 2:
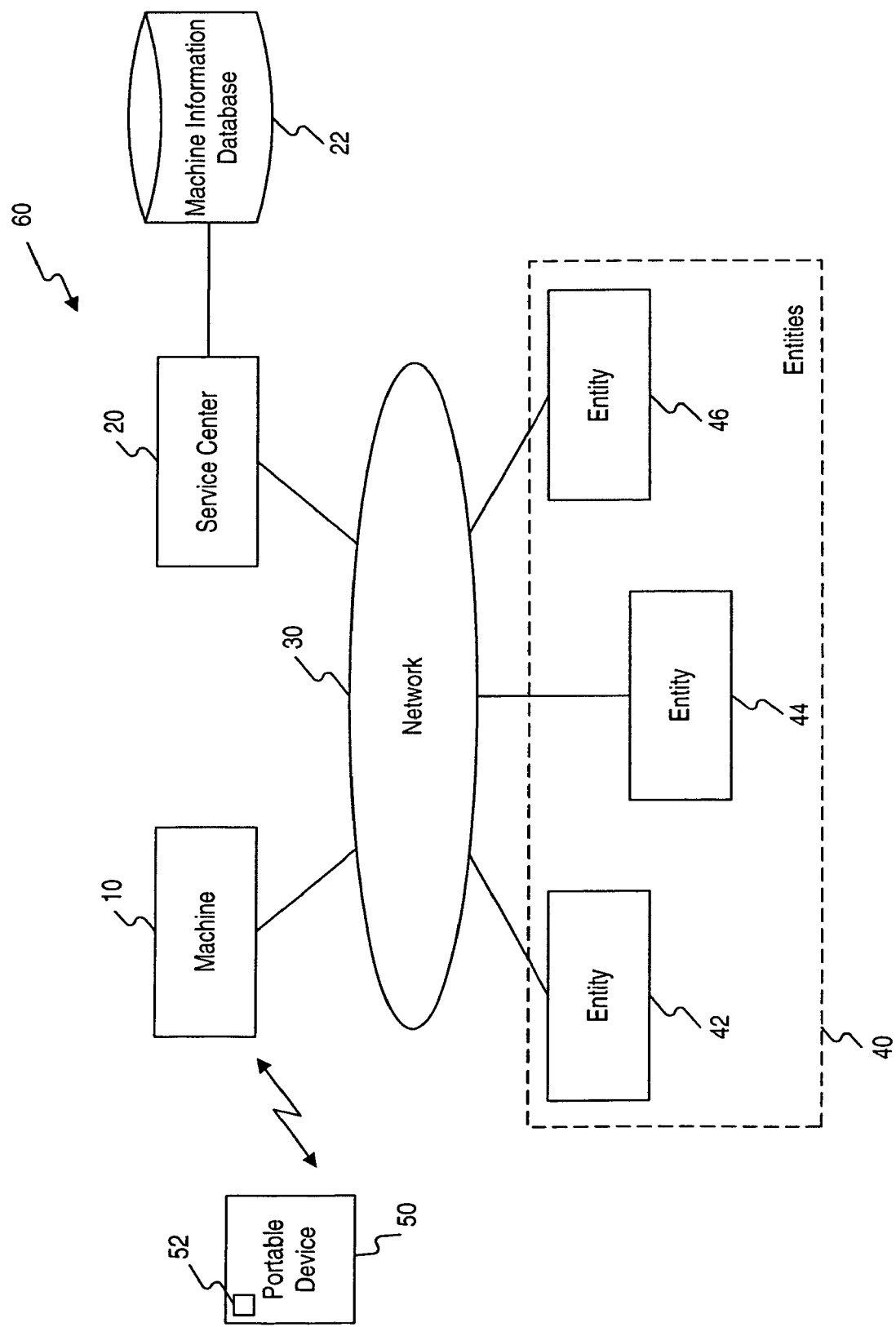
FIG. 2 is a schematic diagram illustrating an exemplary communication system consistent with disclosed embodiments.

Gateway processor device 14 includes one or more processor devices that execute program instructions to perform various functions such as requesting and/or receiving information from ECM 13 and GPS device 16. Further, gateway processor device 14 may generate messages to transmit to an off-board system, such as a service center 20 (FIG. 2). Gateway processor device 14 may be configured with different types of hardware and/or software (e.g., a microprocessor, a gateway, a product link device, a communication adapter, etc.). Gateway processor device 14 may also provide interface functions for transmitting data to, and receiving data from, data communication system 12. Further, gateway processor device 14 may execute software for performing one or more functions consistent with the disclosed embodiment. Also, gateway processor device 14 may include storage device(s) for maintaining data for use by one or more on-board modules (e.g., ECM 13), or one or more off-board systems (e.g., service center 20). For example, gateway processor device 14 may be configured to perform protocol conversions (e.g., tunneling and translations), intelligent routing, and server-based operations, such as data provisioning, application provisioning, Web server operations, electronic mail server operations, data traffic management, and any other type of server-based operations that enable data communication system 12 to retrieve, generate, and/or provide data with off-board systems, e.g., service center 20. For clarity of explanation, FIG. 1 shows gateway processor device 14 as a distinct element. However, "gateway" functionality may be implemented via software, hardware, and/or firmware within other one or more on-board modules, such as ECM 13, which communicates with off-board systems. Thus, gateway processor device 14 may, in certain embodiments, represent functionality or logic embedded within another element.

Transceiver device 15 includes one or more devices that transmit and receive information, such as information collected and stored by gateway processor device 14 from ECM 13 and GPS device 16. Transceiver device 15 may transmit the information to an off-board system, such as service center 20. Further, transceiver device 15 may receive information, such as requests for machine information from service center 20. Alternatively, transceiver device 15 may represent separate transmission and receiver devices, or other devices for providing a communication interface between machine 10 and service center 20.

GPS device 16 generates location data, e.g., GPS coordinates, for machine 10 based on data from a satellite, local tracking system, or any other position sensing system known in the art. The location data may be collected by gateway processor device 14 and may be transmitted to service center 20 via transceiver device 15.

FIG. 2 illustrates an exemplary communication system 60 including machine 10, service center 20 including a machine information database 22, a network 30 including, e.g., one or more additional wireless and/or wire-line communication networks (e.g., satellite networks, RF networks, fiber optic or coaxial cable based networks, twisted pair telephone line networks, or any other type of communication network), and other entities 40, e.g., owners (not shown), dealers 42, law enforcement 44, and vendors 46. According to certain embodiments, communication system 60 may perform one or more processes for identifying and/or locating machines 10 and/or machine components 11 implemented with a data communication system 12. The interaction within communication system 60 to locate and identify a machine 10 is described below with reference to FIG. 3.

Figure 3:
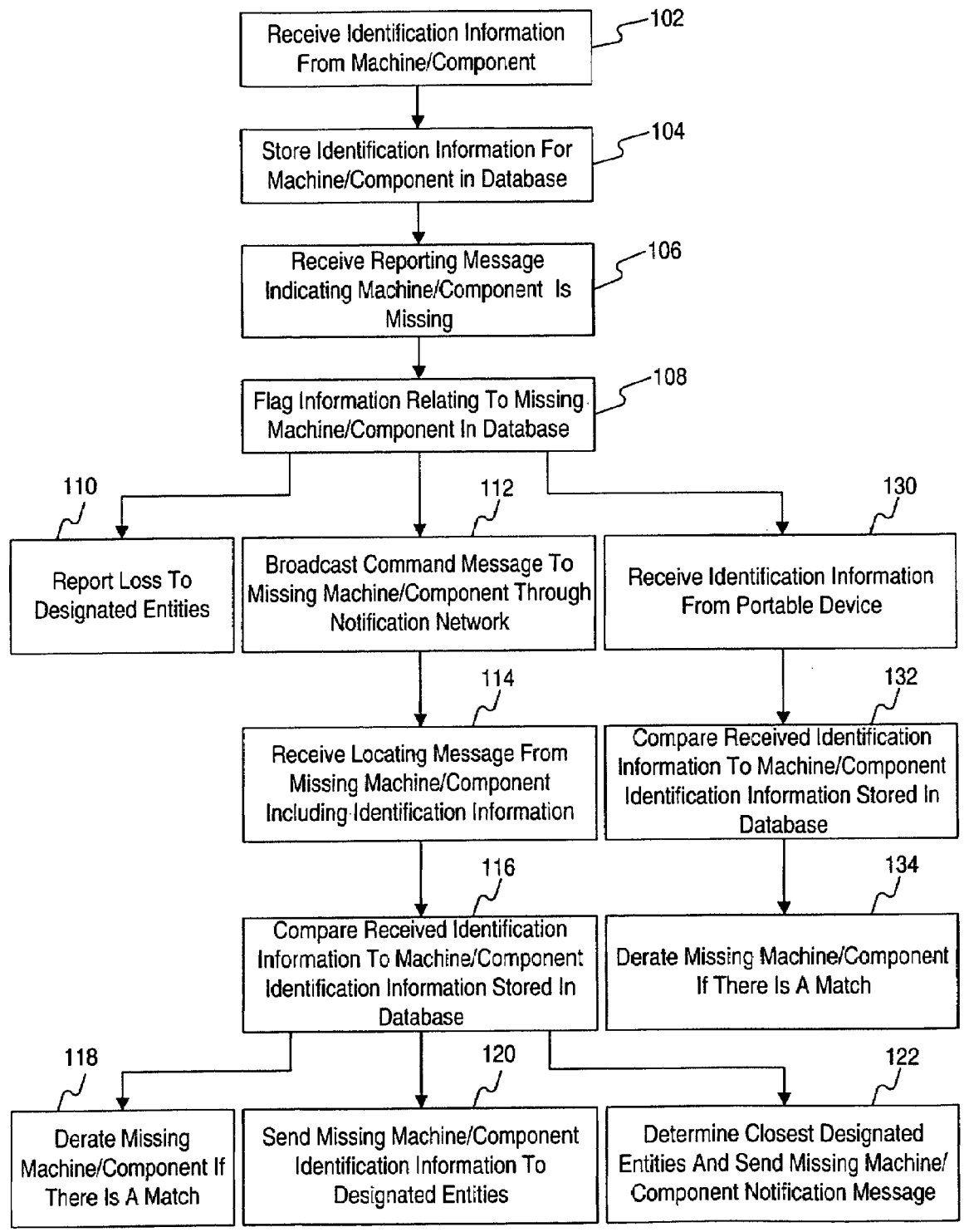
FIG. 3 is a flow chart illustrating an exemplary machine locating process consistent with disclosed embodiments.

FIG. 3 is a flow chart showing an exemplary machine locating process consistent with certain disclosed embodiments to collect and store information regarding machine 10 and/or component 11 to locate a missing machine 10 and/or component 11. In one embodiment, service center 20 receives machine data from data communication system 12 associated with machine 10 and/or component 11 (step 102). As described above, the machine data may include identification information assigned to machine 10 and/or component 11, machine data reflecting operational characteristics of machine 10 and/or machine component 11, etc. For example, the machine data may include one or more machine parameters, e.g., a machine identifier, a historical operational parameter, work site information or other scheduling operational parameter, and/or a fault code. The machine data is unique to a particular machine 10 and/or component 11 and may include a series of values or a string of digits. Service center 20 may also receive location data related to machine 10 and/or component 11, which is determined using GPS device 16, for machine 10 from data communication system 12.

Service center 20 may store the machine data received from machine 10 and/or component 11 in machine information database 22 (step 104). Steps 102 and 104 may be executed one or more times during the lifetime of machine 10 (e.g., following an assembly of machine 10, before machine 10 has been delivered to a work site, and/or after delivery of machine 10 to the work site). Further, steps 102 and 104 may be executed once, after a predetermined event has occurred, or periodically at regular time intervals.

During operation, machine 10 and/or component 11 may periodically, or as demanded by service center 20, provide a status report to service center 20. For example, at the end of a shift for machine 10 (e.g., at the end of the day), machine 10 and/or component 11 may automatically provide a status report, including location data, scheduling data, and/or machine data, to service center 20.

Aspects related to certain embodiments enable the machine data to be used to locate and verify the identity of a machine or machine component. In circumstances where a machine 10 and/or component 11 is reported to be in an abnormal condition, such as when it is missing (e.g., stolen, not returned at end of lease, moved from authorized locations, performing operations or tasks outside defined thresholds or time constraints, unscheduled operation, etc.), trigger events may be implemented to initiate processes for locating and/or verifying the identity of the inspected machines or components. Thus, machine 10 and/or component 11 may be determined to be missing based on an unscheduled trigger event, e.g., starting, changing operations, changing operators, moving, etc. For example, gateway processor device 14 may store scheduling data for machine 10 indicating when machine 10 is scheduled to operate and when it is scheduled not to operate. Gateway processor device 14 may also receive machine data (e.g., engine data from an engine ECM indicating when the engine has started, transmission data from a transmission ECM indicating when the transmission is operating, etc.). Gateway processor device 14 may compare the scheduling data to the machine data, e.g., in real time or periodically, to determine whether there is a conflict (i.e., machine 10 and/or component 11 is operating when it is not scheduled). As a result, gateway processor device 14 may generate and send a reporting message to service center 20 via transceiver device 15 indicating that machine 10 and/or component 11 is missing. The reporting message may include machine data, such as identification information used by service center 20 to identify machine 10 and/or component 11 from other machines and/or components listed in machine information database 22. Alternatively, instead of missing machine 10 sending the reporting message directly to service center 20, an owner of missing machine 10 and/or component 11, or another entity 40 (e.g., dealers 42, law enforcement 44, and vendors 46) may generate and send the reporting message to service center 20 after determining that the machine is missing.

In another embodiment, service center 20 may store scheduling data for machine 10 and/or component 11. Further, service center 20 may receive messages periodically from machine 10 and/or component 11 that include location data for machine 10 and/or component 11. The messages received from machine 10 and/or component 11 may also include other identification information, such as the machine data used to identify machine 10 and/or component 11. Service center 20 may compare the location data to the stored scheduling data to determine whether there is a conflict. If so, service center 20 may identify an abnormal condition for machine 10 and/or component 11.

Service center 20 receives the message reporting that machine 10 and/or component 11 is missing (step 106). Alternatively, service center 20 may determine that machine 10 and/or component 11 is missing based on other information (e.g., machine data). Service center 20 uses machine data included in the reporting message to identify the machine data associated with machine 10 and/or component 11 in machine information database 22. Service center 20 may then flag the information in machine information database 22 associated with missing machine 10 and/or component 11 (step 108). Service center 20 may also report the loss to law enforcement 44 or other entities 40 (step 110).

After flagging the machine data in machine information database 22, service center 20 may also send command messages through network 30 to command all missing machines 10 and/or components 11 that are flagged in machine information database 22 to reply with a locating message (step 112). In response to the command message from service center 20, missing machine 10 and/or component 11 may transmit the locating message to service center 20 via network 30 (step 114). The locating message may include location data associated with missing machine 10 and/or component 11 determined by GPS device 16 and machine data including identification information associated with missing machine 10 and/or component 11 (e.g., one or more historical operational parameters, scheduling operational parameters, and/or other machine data used to uniquely identify machine 10 and/or component 11).

In one embodiment, the specific parameters of machine data provided by missing machine 10 and/or component 11 in the locating message may be specified by service center 20 in the command message. For example, in the command message, service center 20 may request that missing machine 10 include in the locating message the same parameters used to identify the machine 10 in machine information database 22. In another embodiment, the specific parameters of identification information provided by missing machine 10 and/or component 11 in the locating message may be determined automatically by missing machine 10 and/or component 11. Machine 10 and/or component 11 stores information identifying the specific parameters used to identify the machine 10 in machine information database 22 and may send the specified parameters to service center 20 when requested.

Service center 20 compares the received machine data to the machine data associated with machines 10 and/or components 11 stored in machine information database 22 (step 116). Because the same parameters are used to identify machine 10 and/or component 11, the machine data for machine 10 and/or component 11 received in the locating message may be identical to stored machine data for the same machine 10 and/or component 11 that is stored in machine information database 22. In one embodiment, the machine data may be substantially identical. That is, sets of data are substantially identical when they are equal to within a predetermined range, threshold, etc., of sets of data, such as a percentage value (e.g., 1%), a decimal value, (e.g., within 0.0001, 0.001, 0.01, 0.1, etc.), or any other type of threshold or range. Thus, when the machine data received in the locating message matches (or substantially matches) one of the sets of machine data listed in database 22, service center 20 may determine the identity of missing machine 10. The comparison of the machine data may require an exact match or a substantial match. For example, to attain an exact match, service center 20 may determine that the machine data from the locating message matches one of the sets of machine data stored in database 22 when each digit in the set of machine data from the locating message is identical to a corresponding digit of one of the sets of machine data stored in database 22 (e.g., 00111 and 00111). On the other hand, to attain a substantial match, service center 20 may identify machine 10 and/or machine component 11 when a predetermined number of digits (or a predetermined percentage of digits, etc.) match (e.g., 00111 and 0011x).

For example, the locating message from missing machine 10 and/or component 11 may include location data and an identifier. When service center 20 receives the locating message, service center 20 compares the identifier received from missing machine 10 and/or component 11 in the locating message to the identifiers stored in machine information database 22 for the missing machines. If there is a match, then the identity of missing machine 10 and/or component 11 has been determined, and service center 20 sends a message to machine 10 and/or component 11 to derate its performance, e.g., by decreasing engine speed of the engine associated with machine 10 and/or component 11 (step 118). In one embodiment, the engine speed may be decreased such that it does not exceed a predetermined speed, such as a low idle speed or other predetermined low engine speed. Therefore, the engine speed may be automatically decreased such that machine 10 and/or component 11 may perform limited operations depending on the particular machine and/or component. For example, when derated, machine 10 may disable any components 11, but still be able to travel at low speeds. Alternatively, components 11 may be operated at a low power, thereby limiting their use. Furthermore, in one embodiment, derating component 11 may have an effect on a derating of machine 10. For example, if component 11 is derated based on a trigger event, machine 10 may also be automatically derated, e.g., the engine speed may be decreased. The derating of component 11 and/or machine 10 may be proportional or disproportional as based on mappings, rules, an expert system, etc.

By derating engine speed, machine 10 and/or component 11 may be capable of outputting only a fraction of its normal power. For example, machine 10 and/or component 11 may be prevented from moving at higher speeds and may be limited to moving at slower speeds or a crawl, and/or may not have sufficient power to dig or perform other types of operations. By derating engine speed, the transmission may also be derated and may only have enough power to work in certain low gears. For example, after derating, the transmission may only have enough power to operate in first gear, and therefore, the operator of machine 10 may not be able to shift to any higher gears.

One or more trigger events may be implemented to initiate processes for derating the performance of machine 10 and/or component 11. In one embodiment, the derating process may be initiated automatically by machine 10 and/or component 11. For example, machine 10 and/or component 11 may automatically initiate the derating process if it determines that it is in an abnormal condition (e.g., stolen, not returned at end of lease, moved from authorized locations, performing operations or tasks outside defined thresholds or time constraints, unscheduled operation, etc.). In one embodiment, if it is determined that machine 10 and/or component is outside a location in which it is authorized to be (e.g., based on a comparison between its location data and scheduling data) or outside a predetermined area surrounding the location (e.g., a 5 mile radius around the location), then machine 10 and/or component 11 may automatically initiate the derating process. The derating process may also be automatically initiated if machine 10 and/or component 11 enters a location in which it is unauthorized to be or within a predetermined area surrounding such a location. Machine 10 and/or component 11 may also automatically initiate the derating process if it is determined that machine 10 and/or component 11 is being abused, such as when a predetermined number of fault codes or other diagnostic codes have been triggered, parameters exceeded, etc., for a particular component 11, a subset of components 11, and/or for machine 10. Fault codes may be automatically generated by machine 10 and/or component 11 when machine 10 and/or component 11 detects operations that may cause damage, such as when the engine is run above a predetermined limit (overspeed). The fault codes may be stored by ECM 13.

In another embodiment, the derating process may be initiated by service center 20, a portable device 50 (FIG. 2), and/or entity 40 (e.g., dealers 42, law enforcement 44, and vendors 46), such as when service center 20, portable device 50, and/or entity 40 has determined that machine 10 and/or component 11 is in need of inspection. For example, service center 20, portable device 50, and/or entity 40 may initiate the derating process based on one or more trigger events, such as the trigger events described above. Service center 20, portable device 50, and/or entity 40 may also initiate the derating process if it has been determined that machine 10 and/or component 11 is being repossessed. In one embodiment, service center 20, portable device 50, and/or entity 40 may send a derating start command to machine 10 and/or component 11 to initiate the derating process.

The disclosed embodiments also allow the derating process to be delayed to address safety issues related to machine operations. For example, machine 10 and/or component 11 may be derated after completion of a job or task. For example, to avoid safety problems, service center 20 may send a command that instructs ECM 13 of machine 10 to derate the engine speed after machine 10 and/or component 11 is shut down manually. In another embodiment, machine 10 may automatically derate its engine speed after machine 10 and/or component 11 is shut down manually. Thus, machine 10 and/or component 11 can complete operations, but the engine speed will be derated when it is started up again after shutdown.

After derating machine 10 and/or component 11, the operator of machine 10 and/or component 11 may contact service center 20 to determine the cause of the derating. Alternatively, or additionally, service center 20 or other entity 40 may contact the operator of machine 10 and/or component 11 to communicate the cause of the derating. In another embodiment, machine 10 and/or component 11 may automatically receive from service center 20 or other entity 40 information identifying the cause of the derating. This information may be presented to the operator of the derated machine 10 and/or component 11 (e.g., displayed, text messaged, etc.).

Machine 10 and/or component 11 may receive a derating end command that includes data known by personnel who are authorized to end the derating (e.g., personnel of service center 20, the dealer 42 or vendor 46 for the particular machine 10 and/or component 11, the owner of machine 10 and/or component 11, etc.). The derating end command may be input manually using an input device (e.g., a keypad, portable device 50, etc.) or by transmitting a command that is received by transceiver device 15. For example, if machine 10 and/or component 11 was derated because it generated over ten fault codes, service center 20 may send a service technician to inspect machine 10 and/or component 11 before entering the proper code to end the derating. Alternatively, the derating may end when the trigger event that caused the derating is addressed, reversed, and/or eliminated. For example, if machine 10 and/or component 11 leaves its authorized location, the derating process may end when machine 10 and/or component is returned to its authorized location. As a result, the operator of machine 10 and/or component 11 may be unable to end the derating without communicating with service center 20 or other entity 40 or without altering the operations of machine 10 and/or component 11.

After determining the identity of missing machine 10 and/or component 11, service center 20 may also send a missing machine notification message to one or more designated entities 40 (e.g., owners, dealers 42, law enforcement 44, and/or vendors 46) (step 120). The missing machine notification message identifies missing machine 10 and/or component 11 and may include, for example, a message indicating that missing machine 10 and/or component 11 is reported as missing, a machine identifier, and/or location data received in the locating message from missing machine 10 and/or component 11. This information may be used to identify, locate, retrieve, and/or return machine 10 and/or component 11 to its owner.

Service center 20 may also store location data for entities 40 and determine one or more entities 40 that are within a selected geographical range from missing machine 10 and/or component 11 based on the location data received in the locating message from missing machine (e.g., within a predetermined radius from missing machine 10 and/or component 11). Service center 20 may send the missing machine notification message to one or more geographically closest entities (step 122).

Portable device 50 (FIG. 2) may also be used to determine the identity of machine 10 and/or component 11. Portable device 50 may be a handheld or portable device used by one or more entities 40, e.g., dealers 42, law enforcement 44, and/or vendors 46. Portable device 50 may be a handheld computer (e.g., a laptop, personal digital assistant (PDA), etc.), implemented using, for example, PALM® or PocketPC® technology and wireless capabilities. Entity 40 may use portable device 50 to receive information using, for example, a sensor (e.g., an RFID reader or bar code reader) that gathers information from a communication port 18 on machine 10 and/or component 11. The communication port 18 is connected to gateway processor device 14 to allow the information stored on gateway processor device 14 and/or ECM 13 to be transferred to portable device 50. Alternatively, a wireline link may be provided to removably attach portable device 50 to communication port 18, e.g., a Universal Serial Bus (USB) port, RS 232 port, or a port using another communication protocol in data communication system 12. Entity 40 may be able to access information received from gateway processor device 14 by executing software performed by portable device 50. Portable device 50 may also include a transceiver device 52 that allows portable device 50 to transmit information to and receive information from service center 20. Transceiver device 20 may transmit or receive information via wireless or wireline network to service center 20.

In one embodiment, portable device 50 may read machine data (e.g., identification information) from communication port 18 on machine 10 and/or component 11 and may transmit the machine data to service center 20 (step 130). The specific parameters of the machine data read by portable device 50 may be identified based on information stored in portable device 50.

Service center 20 may compare the received machine data to machine data associated with one or more machines and/or components stored in machine information database 22 (step 132). Service center 20 may identify machine 10 and/or component 11 if, for example, the received machine data matches the machine data for a machine 10 and/or component 11 listed in machine information database 22. After determining the identity of machine 10 and/or component 11, if it is determined that machine 10 and/or component 11 is flagged as a missing machine and/or component, service center 20 may send a missing machine notification message to portable device 50. The missing machine notification message may include machine data such as a machine identifier and/or location data.

For example, portable device 50 may read machine data (e.g., identification information) from machine 10 and/or component 11 and may transmit the machine data to service center 20. Service center 20 compares the machine data received from portable device 50 to the machine data stored in machine information database 22 for flagged missing machines and/or components. If the machine data read by portable device 50 matches (or substantially matches) one of the sets of machine data stored in machine information database 22, service center 20 may generate data reflecting that the identity of machine 10 and/or component 11 is determined. After determining the identity of machine 10 and/or component 11, service center 20 may determine whether machine 10 and/or component 11 is flagged as a missing machine. If so, service center 20 may send a missing machine notification message to portable device 50. The missing machine notification message may include a machine identifier, location data, and any other information related to the machine (e.g., identity of the owner, contact information, etc.).

Alternatively, or additionally, portable device 50 may also execute a process that determines the identity of machine 10 and/or component 11 (step 148). To do so, portable device 50 may execute processes similar to those described above in connection with service center 20. For example, portable device 50 may compare the machine data read from machine 10 and/or component 11 against a set of stored machine data downloaded from service center 20. Portable device 50 may store data that is also stored in machine information database 22 and may receive periodic updates from service center 20. If the machine data read from portable device 50 matches (or substantially matches) one of the stored sets of machine data, portable device 50 may generate data reflecting that the identity of machine 10 and/or component 11 has been determined. Portable device 50 may send this message to service center 20 for further processing. Thus, portable device 50 may be used to identify machine 10 without having to transmit the machine data that it reads from machine 10 and/or component 11 to service center 20. After determining the identity of machine 10 and/or component 11, portable device 50 may also determine if machine 10 and/or component 11 is flagged as a missing machine and may notify service center 20. Then, service center 20 may send a missing machine notification message to designated entities 40, e.g., dealers 42, law enforcement 44, and/or vendors 46.

Further, after determining that machine 10 and/or component 11 is a missing machine, portable device 50 may, via direction by service center 20 or by executing software stored on portable device 50, generate and send a message to machine 10 and/or component 11 commanding it to derate its performance, as described above (step 134). Alternatively, if machine 10 and/or component 11 is in the middle of a job, portable device 50 may transmit a message to machine 10 and/or component 11 to derate its performance after completing the job, a task, or any other type of event, etc.

INDUSTRIAL APPLICABILITY

The disclosed embodiments enable machines to be accurately identified and located. For example, machine 10 and/or component 11 may automatically send messages to service center 20 reporting that it is operating under an abnormal condition (e.g., stolen, not returned at end of lease, moved from authorized locations, performing operations or tasks outside defined thresholds or time constraints, unscheduled operation, etc.). Service center 20 may then automatically send missing machine notification messages to designated entities, e.g., local law enforcement, vendors, and dealers. Thus, these entities may be updated as to machine status, such as thefts. This reduces the time to recover a stolen machine, which for example may reduce the negative impact on the machine owner's business.

In one embodiment, a database listing missing machines 10 and/or components 11 may be maintained or it may be used to contact the missing machines 10 and/or components 11. In situations where a missing machine 10 and/or component 11 may be unable to respond immediately to a message from service center 20 instructing machine 10 and/or component 11 to respond with its location data (e.g., because a battery in machine 10 and/or component 11 is removed or is dead), machine 10 and/or component 11 may delay its response (e.g., when the battery is replaced). Therefore, service center 20 may be able to contact missing machine 10 and/or component 11 by sending out the command message periodically.

In another embodiment, portable devices 50 may be provided to inspection agents (e.g., law enforcement, customs agents, dealers, etc.) for use during inspection of machine 10 and/or component 11 (e.g., at a stop and check on the highway, at a border, in a dealer lot, etc.). An inspection agent may be notified in response to machine 10 and/or component 11 determining that it has been stolen and/or when the owner of machine 10 and/or component 11 notifies service center 20. Furthermore, an inspection agent may use portable device 50 to properly identify a machine 10 and/or component 11 that is being inspected and be notified if the machine has been reported missing. Accordingly, if the machine identification information inscribed on the machine is not readable and/or data communication system 12 on machine 10 and/or component 11 is unable to transmit identification information (e.g., transceiver device 15 is removed or damaged), the inspection agent may use portable device 50 to read the identification information from data communication system 12 on machine 10 and/or component 11 to determine its status.

In addition, after identifying a missing machine, service center 20 or portable device 50 may transmit a message to the missing machine and/or component to derate its performance, thereby preventing thieves from operating the missing machine and/or component at normal power, which may prevent the thieves from moving the missing machine and/or component to a different location when recovery personnel are en route to the machine's detected location. This also allows the machine and/or component to be recovered more quickly. If the missing machine and/or component is in the middle of operations, service center 20 or portable device 50 may transmit a message to the missing machine and/or component to initiate a delayed derating operation that derates the performance of the machine after completing a task, job, etc.

Derating instead of completely disabling machine 10 and/or component 11 eliminates the liability to the owner of machine 10 and/or component 11 if the machine and/or component is in an unsafe condition when it is disabled. For example, if a machine is derated when it is located in dangerous locations (e.g., railroad tracks), the machine may still be able to travel at idle speed out of danger. However, the derated machine may not be able to travel faster than idle speed and may not be able to operate any of its components 11. As a result, the derated machine and/or component may be rendered inadequate for its intended use, but is not fully disabled, which would potentially create an unsafe environment.

Also, derating machine 10 and/or component 11 allows an owner of machine 10 and/or component 11 to protect its asset. For example, if an operator of machine 10 and/or component 11 is using machine 10 and/or component 11 in a manner that generates more than a predetermined number of fault codes, the operator may be abusing the machine and/or component. By derating machine 10 and/or component 11, the owner of machine 10 and/or component 11 may be able to have a service technician inspect machine 10 and/or component 11 to determine whether an agreement, warranty, etc., has been breached. Even if it is determined that no damage has been done to machine 10 and/or component 11, the derating process still allows the owner to inform the operator that machine 10 and/or component 11 is being used in an unauthorized manner, e.g., against terms of a leasing agreement, etc.

It will be apparent to those skilled in the art that various modifications and variations can be made to the method and system for inspecting machines. Other embodiments will be apparent to those skilled in the art from consideration of the specification and practice of the disclosed method and system for inspecting machines. It is intended that the specification and examples be considered as exemplary only, with a true scope being indicated by the following claims and their equivalents.

What is claimed is:

1. A method for operating at least one of a machine or a component of the machine, comprising:
    collecting machine data from the at least one machine or machine component over a communications network, the machine data including data reflecting at least one operational parameter associated with the at least one machine or machine component;
    determining that the at least one machine or machine component is in an abnormal condition based on the collected machine data, the abnormal condition including at least one of an unscheduled operation of the at least one machine or machine component, or an unscheduled change in location of the at least one machine or machine component; and
    derating the at least one machine or machine component based on determining that the at least one machine or machine component is in the abnormal condition,
    wherein the derating of the at least one machine or machine component includes disabling at least one machine component of the at least one machine or machine component and allowing the machine to travel.

2. The method of claim 1, wherein the derating of the at least one machine or machine component includes decreasing an engine speed.

3. The method of claim 1, further including:
    receiving a command to derate the at least one machine or machine component; and
    delaying the derating of the at least one machine or machine component based on an operation of the at least one machine or machine component.

4. The method of claim 1, wherein the at least one machine or machine component automatically derates when the at least one machine or machine component determines that the at least one machine or machine component is in the abnormal condition.

5. The method of claim 1, further including sending a command to the at least one machine or machine component to direct the at least one machine or machine component to derate.

6. The method of claim 1, further including:
providing a code to the at least one machine or machine component; and
ending the derating in response to the provided code.

7. The method of claim 1, further including:
receiving, by the at least one machine or machine component, a command to end the derating; and
ending the derating after receiving the end derating command.

8. The method of claim 1, further including automatically ending derating based on detecting that the at least one machine or machine component is no longer in an abnormal condition.

9. The method of claim 1, further including:
receiving a notification that the at least one machine or machine component has been derated;
adjusting an operation of the at least one machine or machine component; and
ending the derating based on the adjusted operation.

10. The method of claim 1, wherein the at least one disabled machine component includes at least one of a hydraulic component, an electro-mechanical component, or an electronic component of the machine.

11. A system for operating at least one of a machine or a component of the machine, comprising:
a service center configured to:
collect and store machine data from the at least one machine or machine component over a communications network, the machine data including data reflecting at least one operational parameter associated with the at least one machine or machine component,
determine that the at least one machine or machine component is in an abnormal condition based on the collected machine data, the abnormal condition includes leaving a predetermined area or entering a predetermined area by the at least one machine or machine component, and
send a command to derate the at least one machine or machine component based on the determining that the at least one machine or machine component is in the abnormal condition;
wherein the command to derate the at least one machine or machine component includes a command to delay the derating of the at least one machine or machine component based on an operation of the at least one machine or machine component.

12. The system of claim 11, wherein the command to derate the at least one machine or machine component includes a command to decrease an engine speed.

13. A method for operating at least one of a machine or a component of the machine, comprising:
storing machine data associated with the at least one machine or machine component, the machine data including data reflecting at least one operational parameter associated with the at least one machine or machine component;
determining that the at least one machine or machine component is in an abnormal condition based on the machine data, the abnormal condition including at least one of an unscheduled operation of the at least one machine or machine component, or an unscheduled change in location of the at least one machine or machine component,
automatically derating the at least one machine or machine component based on the determining that the at least one machine or machine component is in the abnormal condition;
receiving a command to derate the at least one machine or machine component; and
delaying the derating of the at least one machine or machine component based on an operation of the at least one machine or machine component.

14. The method of claim 13, wherein the derating of the at least one machine or machine component includes decreasing an engine speed.

15. The method of claim 13, wherein derating of the at least one machine or machine component further includes derating the machine so that a transmission in the machine is capable of operating only in low gears.

* * * * *